United States Patent
Zhang

(10) Patent No.: US 10,826,309 B2
(45) Date of Patent: Nov. 3, 2020

(54) TERMINAL, HEATING APPARATUS AND CHARGING METHOD FOR BATTERY

(71) Applicant: GUANGDONG OPPO MOBILE TELECOMMUNICATIONS CORP., LTD., Guangdong (CN)

(72) Inventor: Jialiang Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 502 days.

(21) Appl. No.: 15/444,907

(22) Filed: Feb. 28, 2017

(65) Prior Publication Data
US 2017/0170673 A1  Jun. 15, 2017

Related U.S. Application Data

(63) Continuation of application No. PCT/CN2015/070466, filed on Jan. 9, 2015.

(30) Foreign Application Priority Data

Sep. 1, 2014  (CN) .......................... 2014 1 0441387
Sep. 1, 2014  (CN) .......................... 2014 1 0441416
Sep. 1, 2014  (CN) .......................... 2014 1 0441450

(51) Int. Cl.
*H02J 7/00* (2006.01)

(52) U.S. Cl.
CPC .............. *H02J 7/0031* (2013.01); *H02J 7/00* (2013.01); *H02J 7/007* (2013.01); *H02J 7/0045* (2013.01)

(58) Field of Classification Search
CPC .......... H02J 7/0031; H02J 7/00; H02J 7/0045; H02J 7/007; H02J 7/0091; H02J 7/0052;
(Continued)

(56) References Cited

U.S. PATENT DOCUMENTS 6,232,750 B1 * 5/2001 Podrazhansky ...... H02J 7/00711
320/139
2001/0006338 A1 * 7/2001 Yamashita ............ H01M 10/44
320/160
(Continued)

FOREIGN PATENT DOCUMENTS

CN  2872607 Y  2/2007
CN  1303720 C  3/2007
(Continued)

OTHER PUBLICATIONS

Chinese Office Action dated Nov. 28, 2018 for Application No. CN 201580004390.2.
(Continued)

Primary Examiner — Richard Isla
Assistant Examiner — Mohammed J Sharief
(74) Attorney, Agent, or Firm — Ladas & Parry LLP

(57) ABSTRACT

A terminal can include a battery (11), a temperature detection circuit (13), a control circuit (14) and a heating apparatus (15), wherein the control circuit detects a temperature of the battery via the temperature detection circuit, and if the temperature of the battery is detected to be less than a first threshold, the control circuit keeps a charging loop for charging the battery disconnected and controls the heating apparatus to heat the battery; and if the temperature of the battery is detected to be greater than or equal to the first threshold, the control circuit controls the charging loop to be conducted for charging the battery. A heating apparatus and a charging method for a battery are also provided.

5 Claims, 2 Drawing Sheets

(58) Field of Classification Search
CPC ............... Y02E 60/12; Y02T 10/7005; H01M 10/5004; H01M 10/486; H01M 10/502; H01M 10/5083; H01M 10/63; H01M 10/615; H01M 10/6571
USPC ............................................ 320/150; 429/62
See application file for complete search history.

(56) References Cited

U.S. PATENT DOCUMENTS

| | | | |
|---|---|---|---|
| 2002/0070709 A1* | 6/2002 | Small | H01M 2/1055 320/150 |
| 2006/0051660 A1* | 3/2006 | Chang | H01M 10/42 429/62 |
| 2006/0214639 A1* | 9/2006 | Miwa | H02J 7/0071 320/134 |
| 2008/0042621 A1 | 2/2008 | Miglioranza | |
| 2010/0283431 A1* | 11/2010 | Kano | G06F 1/203 320/150 |
| 2010/0327812 A1* | 12/2010 | Hsieh | H02J 7/0086 320/134 |
| 2011/0052944 A1* | 3/2011 | Matthias | H01M 10/44 429/50 |
| 2011/0074362 A1* | 3/2011 | Midorikawa | H01M 10/443 320/150 |
| 2013/0147432 A1 | 6/2013 | Yamamoto et al. | |
| 2014/0035513 A1* | 2/2014 | Kroenke | B60L 58/15 320/107 |
| 2014/0170450 A1* | 6/2014 | Takahashi | H01M 2/1686 429/62 |
| 2014/0333267 A1* | 11/2014 | Crawley | H02J 7/00 320/150 |
| 2015/0166045 A1* | 6/2015 | Chen | H01M 10/625 180/65.265 |
| 2015/0325892 A1* | 11/2015 | Yue | H05B 3/20 429/120 |
| 2016/0043447 A1* | 2/2016 | Peh | H02J 7/0013 320/112 |
| 2016/0185234 A1 | 6/2016 | Miglioranza | |

FOREIGN PATENT DOCUMENTS

| | | |
|---|---|---|
| CN | 201590464 U | 9/2010 |
| CN | 101908771 A | 12/2010 |
| CN | 101102054 B | 9/2012 |
| CN | 102856604 A | 1/2013 |
| CN | 102969743 A | 3/2013 |
| CN | 203134926 U | 8/2013 |
| CN | 203142574 U | 8/2013 |
| CN | 103326405 A | 9/2013 |
| CN | 103427137 A | 12/2013 |
| CN | 103457318 A | 12/2013 |
| CN | 103475041 A | 12/2013 |
| CN | 203617733 U | 5/2014 |
| CN | 103855444 A | 6/2014 |
| CN | 104242388 A | 12/2014 |
| CN | 104242389 A | 12/2014 |
| CN | 104242390 A | 12/2014 |
| CN | 204156553 U | 2/2015 |
| CN | 204316106 U | 5/2015 |
| EP | 1 876 510 A2 | 1/2008 |
| WO | 2013/161549 A1 | 10/2013 |

OTHER PUBLICATIONS

English abstract for CN 103427137 A.
English abstract for CN 102856604 A.
International Search Report (ISR) and Written Opinion (WO) dated May 11, 2015 for International Application No. PCT/CN2015/070466 with English translation of the ISR.
Search Report for Priority Document CN 201410441416.7 dated Sep. 1, 2014.
Search Report for Priority Document CN 201410441387.4 dated Sep. 1, 2014.
Search Report for Priority Document CN 201410441450.4 dated Sep. 1, 2014.
Espacenet English abstract of CN 104242389 A.
Espacenet English abstract of CN 104242388 A.
Espacenet English abstract of CN 104242390 A.
Espacenet English abstract of CN 102969743 A.
Espacenet English abstract of CN 103326405 A.
Espacenet English abstract of CN 103457318 A.
Espacenet English abstract of CN 204156553 U.
Espacenet English abstract of CN 203142574 U.
Espacenet English abstract of CN 103475041 A.
Espacenet English abstract of CN 203134926 U.
Espacenet English abstract of CN 101908771 A.
Espacenet English abstract of CN 203617733 U.
Espacenet English abstract of WO 2013/161549 A1.
Espacenet English abstract of CN204316106 U.
Espacenet English abstract of CN 201590464 U.
Espacenet English abstract of CN 2872607 Y.
Espacenet English abstract of CN 101102054 B.
Espacenet English abstract of CN 103855444 A.
Espacenet English abstract of CN 1303720 C.
European Search Report (ESR) dated Mar. 26, 2018 for Application No. EP 15 83 8468.5.
3rd CN office action application No. 201580004390.2, dated Jun. 10, 2020.
4th CN office action application No. 201580004390.2, dated Sep. 3, 2020.

* cited by examiner

TERMINAL, HEATING APPARATUS AND CHARGING METHOD FOR BATTERY

CROSS-REFERENCE TO RELATED APPLICATIONS

This application is a continuation of International Application No. PCT/CN2015/070466, filed on Jan. 9, 2015, which claims priority to Chinese Patent Application No. 201410441416.7, filed on Sep. 1, 2014, Chinese Patent Application No. 201410441387.4, filed on Sep. 1, 2014, and Chinese Patent Application No. 201410441450.4, filed on Sep. 1, 2014. All of the aforementioned patent applications are hereby incorporated by reference in their entireties.

TECHNICAL FIELD

Embodiments of the present disclosure relate to the field of charging, and in particular, to a terminal.

BACKGROUND

There are many types of terminals, for example, a mobile phone, a palmtop computer, etc. Taking an example of the mobile phone, at present, the third party has developed a large quantity of applications, thus enriching functions of the mobile phone. The mobile phone with abundant functions has gradually become an article which people carry around. As the using frequency of the mobile phone increases gradually, the electric quantities that a battery of the mobile phone may store are limited and thus it needs to be charged frequently.

The battery of the mobile phone generally has an appropriate operating temperature, a too low temperature may influence the charging efficiency of the mobile phone. Taking an example of a lithium battery, the lithium battery may operate within a temperature range of −10° C. to 55° C., but it is relatively appropriate to charge within a temperature range of 5° C. to 45° C., and particularly preferable to charge within a range of 10° C. to 35° C.; however, the charging effect of the battery will become poor beyond a temperature range of 5° C. to 45° C., and particularly poorer at a temperature below 5° C. The reason is that, with the decreasing of the temperature, the activity of a lithium ion will become poor, so that lithium ion is apt to deposit on the surface of a graphite crystal to form lithium metal, and the formed lithium metal may have an irreversible reaction with an electrolyte, thus resulting in that the lithium battery may only be charged with a few electric quantities in a long time or even cannot be charged. In addition, if the lithium battery is charged at a low temperature for a long time, not only will the capacity thereof be decreased, but also the life time thereof will be influenced. Therefore, many mobile phones are set to automatically interrupt charging when the temperature of a lithium battery is below a certain temperature.

To sum up, the problem of charging a terminal under a low temperature condition has not been solved in the related art.

BRIEF DESCRIPTION OF DRAWINGS

To illustrate the technical solutions provided in the embodiments of the present disclosure more clearly, a brief introduction to the accompanying drawing which is needed in the embodiments of the present disclosure will be given below. Obviously, the accompanying drawing described below is merely some of the embodiments of the present disclosure, based on which other drawings can be acquired by a person of ordinary skill in the art without any inventive efforts.

DETAILED DESCRIPTION OF EMBODIMENTS

Hereinafter, the technical solutions in the embodiments of the present disclosure will be described clearly and completely with reference to the accompanying drawing in the embodiments of the present disclosure. Evidently, the described embodiments are merely part, but not all, of the embodiments of the present disclosure. All other embodiments, which can be derived by a person of ordinary skill in the art based on the embodiments of the present disclosure without any inventive efforts, shall fall into the protection scope of the present disclosure.

Figure 1:
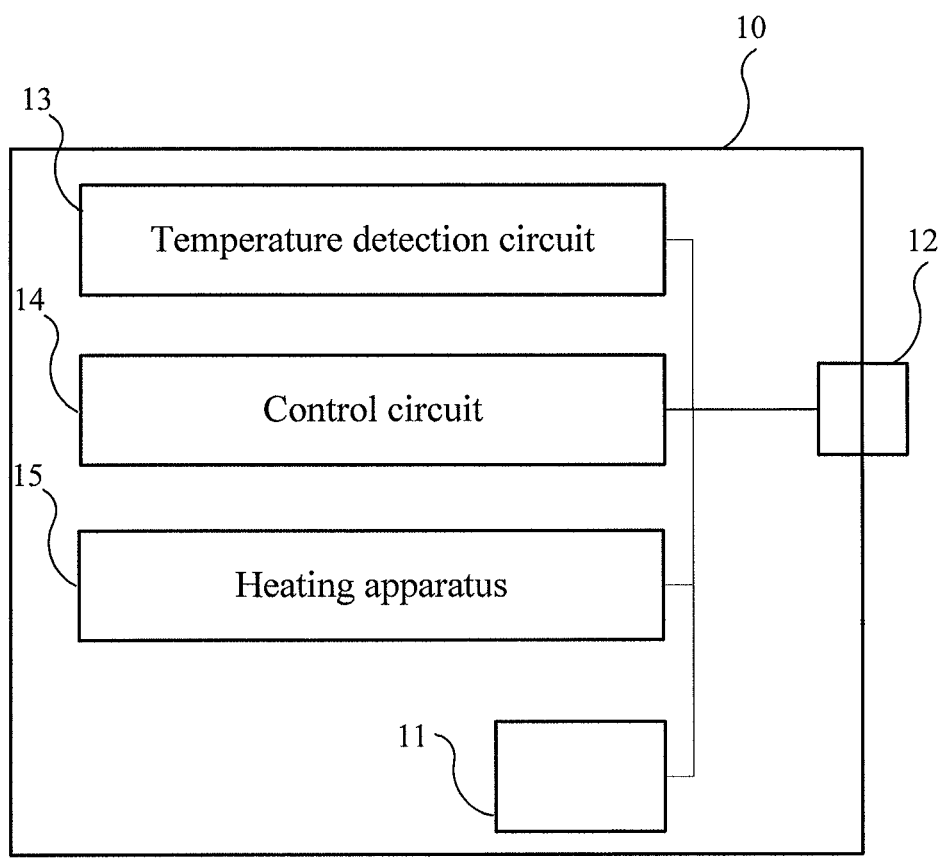
FIG. 1 is a schematic block diagram of a terminal in an embodiment of the present disclosure.

FIG. 1 is a schematic block diagram of a terminal in an embodiment of the present disclosure. A terminal 10 in FIG. 1 includes a battery 11 and a charging interface 12, the terminal 10 forms a charging loop with a power adaptor via the charging interface 12 for charging the battery 11, and the terminal 10 further includes a temperature detection circuit 13, a control circuit 14 and a heating apparatus 15.

The control circuit 14 detects a temperature of the battery 11 by the temperature detection circuit 13 when the power adaptor is coupled to the terminal 10; if the temperature of the battery 11 is detected to be less than a first threshold, the control circuit 14 keeps the charging loop disconnected and controls the heating apparatus 15 to heat the battery 11; and if the temperature of the battery 11 is detected to be greater than the first threshold, the control circuit 14 controls the charging loop to be conducted for charging the battery 11.

For example, the first threshold may be set as 0° C., and when a temperature of the battery is detected to be less than 0° C., the control circuit 14 keeps the charging loop disconnected and controls the heating apparatus 15 to heat the battery 11; and when the temperature of the battery is detected to be greater than 0° C., the control circuit 14 controls the charging loop to be conducted for charging the battery 11. It should be noted that setting of the first threshold is related to many parameters such as a type of a battery and a capacity of a battery and the like, and the first threshold may be set according to the actual situations, for example, the charging effect of the battery is relatively poor below 0° C., the charging effect thereof is modest between 0° C. to 5° C. and the charging effect thereof is relatively good above 5° C., and thus the first threshold may also be set as 5° C.

In the embodiments of the present disclosure, when the temperature of the battery is less than the first threshold, the terminal controls the charging loop to keep disconnected for heating the battery, when the temperature of the battery is greater than the first threshold, the terminal controls the charging loop to be conducted for charging the battery, thereby ensuring that the battery can be charged at an appropriate temperature, which solves the problem of having difficulty in charging at a relatively low temperature.

Alternatively, as an embodiment, if the temperature of the battery is detected to be greater than the first threshold and less than a second threshold, the control circuit 14 controls the charging loop to charge the battery in a normal charging mode; and if the temperature of the battery is detected to be greater than the second threshold, the control circuit 14 controls the charging loop to charge the battery in a quick charging mode, wherein a charging current in the quick charging mode is greater than a charging current in the normal charging mode.

For example, the first threshold may be set as 0° C., and the second threshold may be set as 10° C. If a temperature of the battery is detected to be within an interval of 0° C. to 10° C., it is indicated that the terminal may charge the battery, but an overhigh charging current should not be adopted, and the normal charging mode may be used in this case to control a current between 1 A and 3 A; and if the temperature of the battery is detected to be higher than 10° C., it is indicated that the battery is under a comparatively good temperature environment, and the quick charging mode may be used to charge the battery at a relatively high current, for example, a charging current is set to be equal to or even higher than 4 A.

Alternatively, if the temperature of the battery is detected to be greater than a third threshold, the control circuit 14 controls the charging loop to be disconnected, wherein the third threshold is greater than the second threshold.

For example, the third temperature is set as 45° C., and when a temperature of the battery 11 is above 45° C., it is indicated that the temperature of the battery 11 is too high and a fault may occur if continuing to charge, and in this case the control circuit 14 controls the charging loop to be disconnected.

Alternatively, as an embodiment, that the control circuit 14 controls the heating apparatus 15 to heat the battery 11 includes in detail: when the temperature of the battery 11 is not heated to the first threshold, the control circuit 14 keeps the charging loop disconnected; and when the temperature of the battery 11 is heated to the first threshold, the control circuit 14 controls the charging loop to be conducted for charging the battery 11.

For example, the first threshold may be set as 0° C.; when a mobile phone is charged in a cold environment (for example, the temperature is −15° C.), the control circuit 14 first heats the battery 11, and when the temperature of the battery 11 does not reach 0° C., it is still not suitable to charge the battery 11; and when the battery 11 is heated to 0° C., it is indicated that the battery 11 reaches a temperature available for charging, and in this case the control circuit 14 controls the charging loop to be conducted for charging the battery 11.

Alternatively, as an embodiment, that when the temperature of the battery 11 is heated to the first threshold, the control circuit 14 controls the charging loop to charge the battery 11 includes in detail: when the temperature of the battery 11 is heated to the first threshold, the control circuit 14 controls the charging loop to charge the battery 11 in a normal charging mode; and when the temperature of the battery 11 is heated to a fourth threshold, the control circuit 14 controls the charging loop to charge the battery 11 in a quick charging mode, wherein the fourth threshold is greater than the first threshold, and a charging current in the quick charging mode is greater than a charging current in the normal charging mode.

For example, the fourth threshold may be set as 10° C., and when the heating apparatus 15 heats the battery 11 to the temperature thereof up to 0° C., it is indicated that the battery reaches a temperature available for charging, but it is not suitable to use a high charging current, and the normal charging mode may be used to charge the terminal in this case, wherein the charging current in the normal charging mode may be set as an value from 1 A to 3 A; and when the heating apparatus 15 heats the battery 11 to the temperature thereof up to 10° C., it is indicated that the battery 11 is under a comparatively good temperature environment, and a high current may be used to charge the battery, and in this case, the quick charging mode is used to charge the terminal, and the charging current in the quick charging mode may be set as 4 A or even higher.

Alternatively, as an embodiment, that the control circuit 14 controls the charging loop to charge the battery 11 further includes: when the temperature of the battery 11 is heated to a fifth threshold, the control circuit 14 controls the heating apparatus 15 to be disconnected, wherein the fifth threshold is greater than or equal to the fourth threshold.

For example, the fifth threshold may be set as 45° C., which indicates that it is not suitable to heat the battery 11 to the temperature thereof above 45° C. The charging effect may be relatively poor if the temperature exceeds 45° C., and the battery 11 may even be damaged.

Alternatively, as an embodiment, the heating apparatus 15 includes a heating circuit and a heating film, the heating circuit heats the battery via the heating film, and the heating film sleeves on a surface of a shell of the battery 11, or the heating film is pasted on a surface of the shell of the battery 11, or the heating film is positioned on an internal surface of the battery jar, or the heating film is positioned on an internal surface of a rear cover of the terminal and the heating film is pasted on an external surface of the battery when the rear cover is closed, or the heating film is positioned inside the battery.

Figure 2:
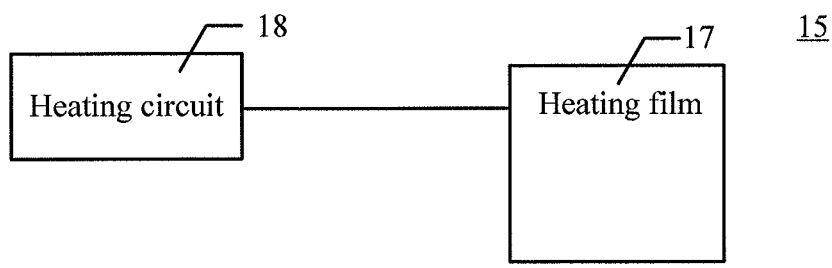
FIG. 2 is a schematic block diagram of a heating apparatus in an embodiment of the present disclosure.

FIG. 2 is a schematic block diagram of a heating apparatus in an embodiment of the present disclosure. Referring to FIG. 2, the heating apparatus 15 includes a heating circuit 18 and a heating film 17, and the heating circuit 18 is coupled to the heating film 17.

Alternatively, as an embodiment, a resistance wire in a winding shape is positioned in the heating film, wherein the resistance wire has a high resistance value, and a large quantity of thermal energy is produced after a current flows through the resistance wire, and thereby the battery is heated.

Figure 3:
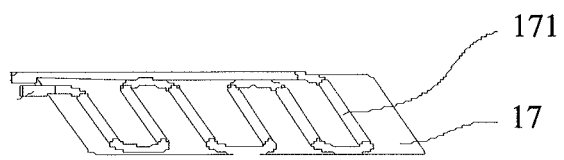
FIG. 3 is a schematic diagram of a heating film in an embodiment of the present disclosure.

FIG. 3 is a schematic diagram of a heating film in an embodiment of the present disclosure. Referring to FIG. 3, the heating film 17 has a resistance wire 171 positioned therein.

Figure 4:
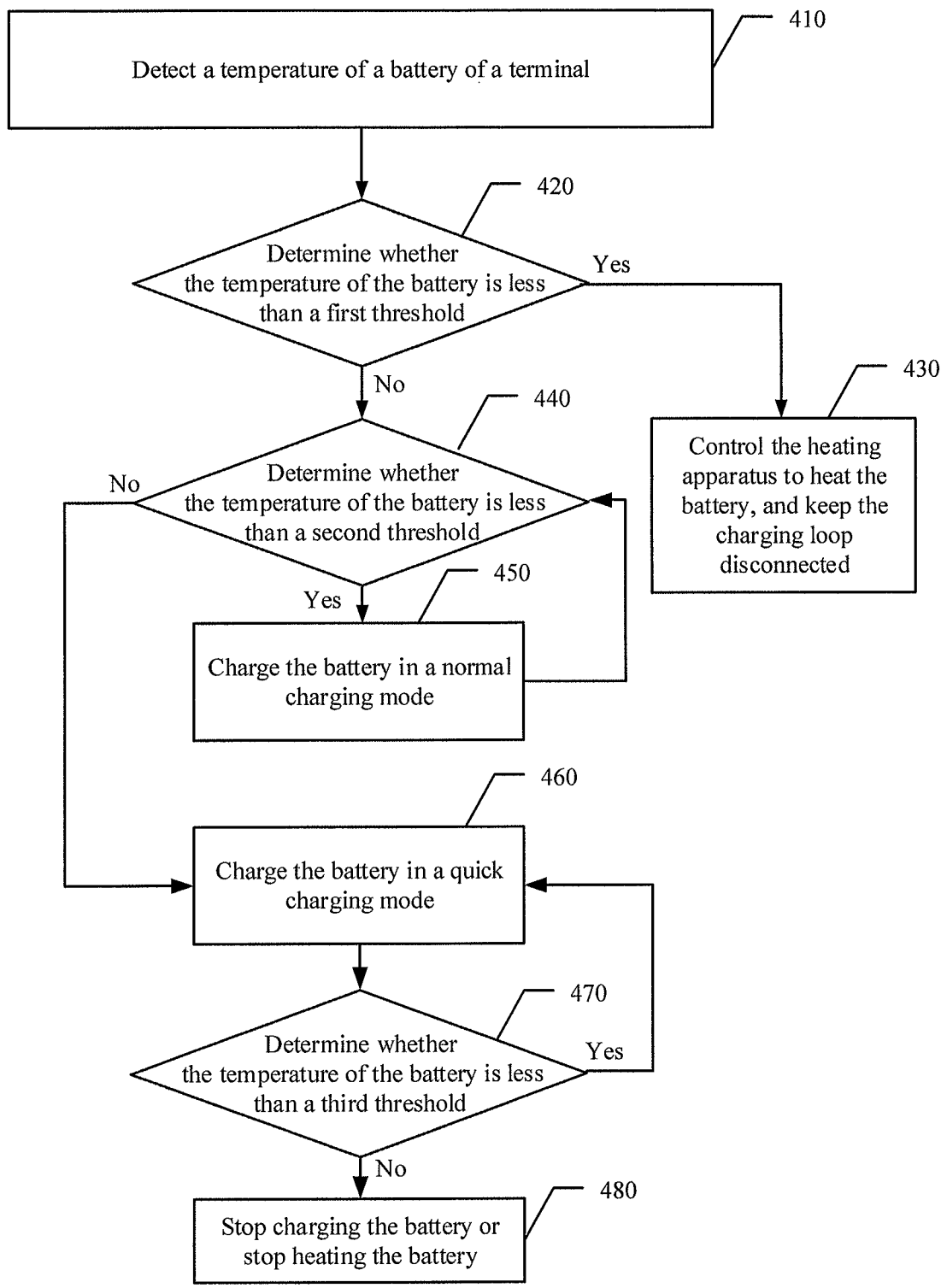
FIG. 4 is a schematic flowchart of a charging method in an embodiment of the present disclosure.

FIG. 4 is a schematic flowchart of a charging method in an embodiment of the present disclosure. The charging method is performed by a control circuit in the foregoing embodiments or a controller. The charging method can begin at block 410.

At block 410, a temperature of a battery of a terminal is detected.

At block 420, it is determined whether the temperature of the battery is less than a first threshold. If the temperature of the battery is detected to be less than a first threshold, acts at block 430 are performed; otherwise, acts at block 440 are performed to control the charging loop to be conducted for charging the battery. The terminal forms a charging loop with a power adaptor via the charging interface for charging the battery when the power adaptor is coupled to the terminal.

At block 430, if the temperature of the battery is detected to be less than the first threshold, a heating apparatus of the terminal is controlled to heat the battery, and the charging loop of the terminal is kept disconnected.

At block 440, it is determined whether the temperature of the batter is less than a second threshold. If the temperature of the batter is less than the second threshold, acts at block 450 are performed; otherwise, acts at block 460 are performed.

At block 450, the charging loop is controlled to charge the battery in a normal charging mode if the temperature of the battery is detected to be greater than or equal to the first threshold and less than a second threshold.

At block 460, the charging loop is controlled to charge the battery in a quick charging mode if the temperature of the battery is detected to be greater than or equal to the second threshold. A charging current in the quick charging mode is greater than a charging current in the normal charging mode.

At block 470, it is determined whether the temperature of the battery is less than a third threshold. If the temperature of the battery is detected to be great than or equal to the first threshold and less than the third threshold, the heating apparatus is controlled to continue heating the battery.

At block 480, the charging loop is controlled to be disconnected or the heating apparatus is controlled to stop heating the battery if the temperature of the battery is detected to be great than or equal to the third threshold. The third threshold is greater than the second threshold.

A person of ordinary skill in the art may realize that the units and steps of algorithm of the respective examples, described with reference to the embodiments disclosed in the text, can be accomplished by electronic hardware, or a combination of computer software and electronic hardware. Whether these functions are executed by means of hardware or software depends on a specific application and a design constraint condition of the technical solutions. Professional technical personnel may accomplish the described functions by adopting a different method for each specific application, but this kind of accomplishment should not go beyond the scope of the present disclosure.

A person skilled in the art may understand clearly that, for convenience and simplicity of description, specific working processes of the above-described systems, apparatus and units may be referred to corresponding processes in the aforementioned embodiments of the methods, and will not be described repeatedly herein.

In several embodiments provided by the present application, it should be understood that disclosed systems, apparatus and methods may be implemented by other manners. For example, the embodiments of the apparatus described above are just illustrative. For example, division of the units is just a kind of division according to logical functions, and there may be other division manners for practical implementations. For example, multiple units or components may be combined or integrated into another system, or some features may be neglected or may not be performed. In addition, the shown or discussed mutual coupling or direct coupling or communication link may be an indirect coupling or communication link through some interfaces, apparatus or units, which may be in an electrical form, a mechanical form or in other forms.

The units described as separated parts may be, or may not be, physically separated, and the parts shown as units may be, or may not be, physical units, which may be located in one place or distributed to multiple network elements. Part or all units therein may be selected, according to an actual need, to implement the objective of solutions provided in the present disclosure.

In addition, the respective functional units in the respective embodiments of the present disclosure may be integrated into one processing unit, or the respective units may exist separately and physically, or, two or more units may be integrated into one unit.

If the function is implemented in the form of a software functional unit and is sold or used as an independent product, the function may be stored in a computer readable storage medium. Based on this understanding, the spirit, or the parts that make contributions to the prior art, of the technical solution in the present disclosure may be embodied in the form of a software product. The computer software product is stored in a storage medium, and includes a number of instructions that enable a computer device (may be a personal computer, a server, or a network device) to execute all or part of steps of the method described in the respective embodiments of the present disclosure. The preceding storage mediums includes various mediums that can store program codes, such as, a U disk, a removable hard disk, a read-only memory (Read-Only Memory, ROM), a random access memory (Random Access Memory, RAM), a magnetic disk, an optical disk, or the like.

The foregoing descriptions are merely specific implementations of the present disclosure, rather than limiting the protection scope of the present disclosure. Any changes or alternatives that can be easily conceived by a person skilled in the art within the technical scope disclosed by the present disclosure should all fall in the protection scope of the present disclosure. Therefore, the protection scope of the present disclosure should be based on the claims.

The invention claimed is:

1. A terminal, comprising: a battery, a temperature detection circuit, a control circuit and a heating apparatus, the temperature detection circuit being coupled to the control circuit and configured to detect a temperature of the battery, and the heating apparatus being coupled to the control circuit and configured to heat the battery under the control of the control circuit, wherein the control circuit detects the temperature of the battery by the temperature detection circuit when the temperature of the battery is detected to be less than a first threshold, the control circuit keeps a charging loop for charging the battery disconnected and controls the heating apparatus to heat the battery; when the temperature of the battery is detected to be greater than or equal to the first threshold, the control circuit controls the charging loop to be conducted for charging the battery, and the control circuit controls the heating apparatus to continue heating the battery;

wherein the terminal further comprises a charging interface and forms the charging loop with a power adaptor via the charging interface for charging the battery when the power adaptor is coupled to the terminal;

when the temperature of the battery is detected to be greater than or equal to the first threshold and less than a second threshold, the control circuit controls the charging loop to charge the battery in a normal charging mode;

when the temperature of the battery is detected to be greater than or equal to the second threshold, the control circuit controls the charging loop to charge the battery in a quick charging mode;

wherein a charging current in the quick charging mode is greater than a charging current in the normal charging mode;

wherein the control circuit further controls the heating apparatus to continue heating the battery and controls the charging loop to continue charging the battery when the temperature of the battery is greater than or equal to the first threshold and less than a third threshold;

wherein the control circuit further controls the heating apparatus to stop heating the battery and the charging loop to be disconnected when the temperature of the battery is greater than or equal to the third threshold, the third threshold being greater than the second threshold; and wherein the heating apparatus comprises a heating circuit and a heating film, the heating circuit being configured to heat the battery via the heating film.

2. The terminal as claimed in claim 1, the heating film being positioned as one of the following:

the heating film being disposed as a sleeve on a surface of a shell of the battery, the heating film being pasted on a surface of the shell, the heating film being positioned on an internal surface of a battery jar of the battery, the heating film being positioned on an internal surface of a rear cover of the terminal, and the heating film being pasted on an external surface of the battery when the rear cover is closed, and the heating film being positioned inside the battery.

3. The terminal as claimed in claim 2, wherein the heating film has a resistance wire positioned therein.

4. A charging method, comprising:

detecting a temperature of a battery;

controlling a heating apparatus to heat the battery and keeping a charging loop for charging the battery disconnected if the temperature of the battery is detected to be less than a first threshold;

controlling the charging loop to be conducted for charging the battery and the heating apparatus to continue heating the battery if the temperature of the battery is detected to be greater than or equal to the first threshold;

wherein controlling the charging loop to be conducted for charging the battery if the temperature of the battery is detected to be greater than or equal to the first threshold comprises:

controlling the charging loop to charge the battery in a normal charging mode if the temperature of the battery is detected to be greater than or equal to the first threshold and less than a second threshold;

controlling the charging loop to charge the battery in a quick charging mode if the temperature of the battery is detected to be greater than or equal to the second threshold, wherein a charging current in the quick charging mode is greater than a charging current in the normal charging mode;

controlling the heating apparatus to continue heating the battery and the charging loop to continue charging the battery if the temperature of the battery is detected to be greater than or equal to the first threshold and less than a third threshold; and controlling the charging loop to be disconnected and the heating apparatus to stop heating the battery if the temperature of the battery is detected to be greater than or equal to the third threshold, the third threshold being greater than the second threshold.

5. The charging method as claimed in claim 4, wherein the charging loop is formed by a terminal with a power adaptor via a charging interface of the terminal for charging the battery when the power adaptor is coupled to the terminal.

* * * * *